US012791926B2

(12) United States Patent
Zhang et al.

(10) Patent No.: US 12,791,926 B2
(45) Date of Patent: Nov. 10, 2026

(54) ALIGNMENT MODULE APPLIED FOR A PROJECTION APPARATUS

(71) Applicant: QISDA CORPORATION, Taoyuan City (TW)

(72) Inventors: Jia-Ming Zhang, Taichung City (TW); Ching-Tze Huang, Taoyuan City (TW); Tsung-Hsun Wu, Taoyuan City (TW)

(73) Assignee: QISDA CORPORATION, Taoyuan City (TW)

( * ) Notice: Subject to any disclaimer, the term of this patent is extended or adjusted under 35 U.S.C. 154(b) by 283 days.

(21) Appl. No.: 18/655,297

(22) Filed: May 5, 2024

(65) Prior Publication Data

US 2024/0384857 A1 Nov. 21, 2024

(30) Foreign Application Priority Data

May 15, 2023 (CN) ......................... 202310540888.7

(51) Int. Cl.
*G03B 21/20* (2006.01)
*F21V 9/30* (2018.01)
*G02B 27/28* (2006.01)

(52) U.S. Cl.
CPC ....... *G03B 21/204* (2013.01); *G03B 21/2066* (2013.01); *G03B 21/208* (2013.01); *F21V 9/30* (2018.02); *G02B 27/286* (2013.01)

(58) Field of Classification Search
CPC . G03B 21/204; G03B 21/2066; G03B 21/208
See application file for complete search history.

(56) References Cited

U.S. PATENT DOCUMENTS

| | | | | |
|---|---|---|---|---|
| 9,983,471 | B1 * | 5/2018 | Lin | H04N 9/3152 |
| 12,189,281 | B2 * | 1/2025 | Zhang | G03B 21/2013 |
| 2009/0268168 | A1 | 10/2009 | Wang | |
| 2012/0242912 | A1 | 9/2012 | Kitano | |
| 2013/0322056 | A1 * | 12/2013 | Konuma | F21V 13/14 362/84 |
| 2016/0313633 | A1 * | 10/2016 | Kato | G02B 27/141 |
| 2018/0299662 | A1 | 10/2018 | Maes | |
| 2018/0299757 | A1 * | 10/2018 | Liao | G03B 21/204 |
| 2018/0299758 | A1 * | 10/2018 | Liao | G03B 21/204 |

(Continued)

OTHER PUBLICATIONS

Zhang, the specification, including the claims, and drawings in the U.S. Appl. No. 18/655,315, filed May 5, 2024.

*Primary Examiner* — Bao-Luan Q Le
(74) *Attorney, Agent, or Firm* — Winston Hsu

(57) ABSTRACT

An alignment module includes a light source module, a collimator lens, a wavelength transformation module, a polarizing beamsplitter and a quarter wave plate. The light source module provides a first illumination beam with a first polarization state. The wavelength transformation module receives the first illumination beam to generate an actuation beam and reflect the first illumination beam. The polarizing beamsplitter is disposed between the light source module and the collimator lens and allows passing of the actuation beam. The quarter wave plate is disposed on a downstream of the polarizing beamsplitter. The first illumination beam with the first polarization state is transformed into a second illumination beam with a second polarization state via the quarter wave plate.

18 Claims, 7 Drawing Sheets

(56) References Cited

U.S. PATENT DOCUMENTS

| | | | | |
|---|---|---|---|---|
| 2018/0373132 | A1* | 12/2018 | Miyazaki | G03B 21/204 |
| 2019/0199981 | A1 | 6/2019 | Murakami | |
| 2020/0301260 | A1* | 9/2020 | Takano | G03B 21/208 |
| 2020/0301266 | A1* | 9/2020 | Nakamura | G03B 33/08 |
| 2021/0055641 | A1* | 2/2021 | Chien | G03B 21/208 |
| 2021/0136336 | A1* | 5/2021 | Takano | G03B 21/208 |
| 2021/0200075 | A1* | 7/2021 | Nakamura | G03B 21/204 |
| 2021/0223672 | A1* | 7/2021 | Yokoo | F21V 7/30 |
| 2021/0389652 | A1* | 12/2021 | Takano | G03B 21/2066 |
| 2022/0026788 | A1* | 1/2022 | Akiyama | G03B 21/2073 |
| 2022/0066177 | A1* | 3/2022 | Takano | G03B 21/008 |
| 2022/0171267 | A1* | 6/2022 | Takano | G03B 21/204 |
| 2022/0171268 | A1* | 6/2022 | Hirakawa | G03B 21/2066 |
| 2022/0179298 | A1* | 6/2022 | Fujita | H04N 9/3111 |
| 2022/0206371 | A1* | 6/2022 | Chen | G02B 27/18 |
| 2022/0299852 | A1* | 9/2022 | Nakamura | G03B 21/2066 |
| 2022/0342291 | A1* | 10/2022 | Fujita | G03B 21/208 |
| 2022/0345671 | A1* | 10/2022 | Sasaki | G03B 21/204 |
| 2022/0382137 | A1* | 12/2022 | Takano | G03B 33/08 |
| 2023/0042973 | A1* | 2/2023 | Fujita | G03B 21/204 |
| 2023/0046512 | A1* | 2/2023 | Kaneda | F21V 9/40 |
| 2023/0110183 | A1* | 4/2023 | Takano | G02B 27/18<br>353/102 |
| 2023/0251558 | A1* | 8/2023 | Nakamura | G03B 21/2066<br>353/98 |
| 2023/0288791 | A1* | 9/2023 | Takano | G03B 21/20 |
| 2024/0176220 | A1* | 5/2024 | Fujita | G03B 21/204 |

* cited by examiner

ALIGNMENT MODULE APPLIED FOR A PROJECTION APPARATUS

BACKGROUND OF THE INVENTION

1. Field of the Invention

The present invention relates to an alignment module, and more particularly, to an alignment module applied for a projection apparatus and having fewer optical components for cost reduction.

2. Description of the Prior Art

The conventional laser projector utilizes the blue light laser source to provide the illumination beam. The illumination beam is transformed into an excitation beam with different color via the wavelength conversion device (such as the color wheel partly covered by phosphor powder or quantum dot material); then, the excitation beam can be mixed with the illumination beam for related application. The conventional alignment module utilizes the dichroic component to reflect the illumination beam toward the color wheel. A portion of the color wheel made by wavelength conversion material generates the excitation beam accordingly, and the excitation beam can pass through the dichroic component. Besides, a part of the illumination beam passes through another portion of the color wheel without the wavelength conversion material and moves back the dichroic component via reflecting components, and then is reflected by the dichroic component to mix with the excitation beam. Therefore, the conventional alignment module has drawbacks of expensive hardware cost and heavy weight due to a large number of optical components.

SUMMARY OF THE INVENTION

The present invention provides an alignment module applied for a projection apparatus and having fewer optical components for cost reduction for solving above drawbacks.

According to the claimed invention, an alignment module includes a light source module, a collimator lens, a wavelength transformation module, a polarizing beamsplitter, a quarter wave plate and a dichroic mirror. The light source module is adapted to provide a first illumination beam with a first polarization state in a first direction. The collimator lens has a first part, a second part, and an axle located between the first part and the second part. The wavelength transformation module is adapted to receive the first illumination beam from the first part of the collimator lens, and alternately generate an actuation beam and reflect the first illumination beam. The actuation beam is transmitted towards the first part and the second part of the collimator lens in a second direction, and the first illumination beam is reflected towards the second part of the collimator lens in the second direction, and the second direction is perpendicular to the first direction. The polarizing beamsplitter is disposed on position corresponding to the first part, and the polarizing beamsplitter is adapted to reflect the first illumination beam with the first polarization state, and further allow passing of the actuation beam and a second illumination beam with a second polarization state. The quarter wave plate is disposed on a rear optical path relative to the polarizing beamsplitter, and the first illumination beam with the first polarization state is transformed into the second illumination beam with the second polarization state via the quarter wave plate. The dichroic mirror is disposed on position corresponding to the second part, and further on a rear optical path relative to the quarter wave plate. The dichroic mirror is adapted to allow passing of the actuation beam and further to reflect the first illumination beam from the quarter wave plate.

According to the claimed invention, the quarter wave plate is disposed on a rear optical path relative to the collimator lens and further on position corresponding to the second part, or the quarter wave plate is disposed on a front optical path relative to the collimator lens and further on position corresponding to the first part, or the quarter wave plate is disposed between the collimator lens and the wavelength transformation module and further on position corresponding to the first part or the second part.

The alignment module of the present invention can utilize feature of the illumination beam with a specific polarization state passing through the quarter wave plate twice to transform into the illumination beam with another polarization state, and feature of the quarter wave plate that allows passing of the actuation beam with the small-sized polarizing beamsplitter (which only corresponds to the left portion or a right portion of the collimator lens) to pass the illumination beam through the quarter wave plate back and forth for the double transformation, so as to provide light splitting and mixing functions via the polarizing beamsplitter for decreasing a number of optical components and manufacturing cost of the projection apparatus.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
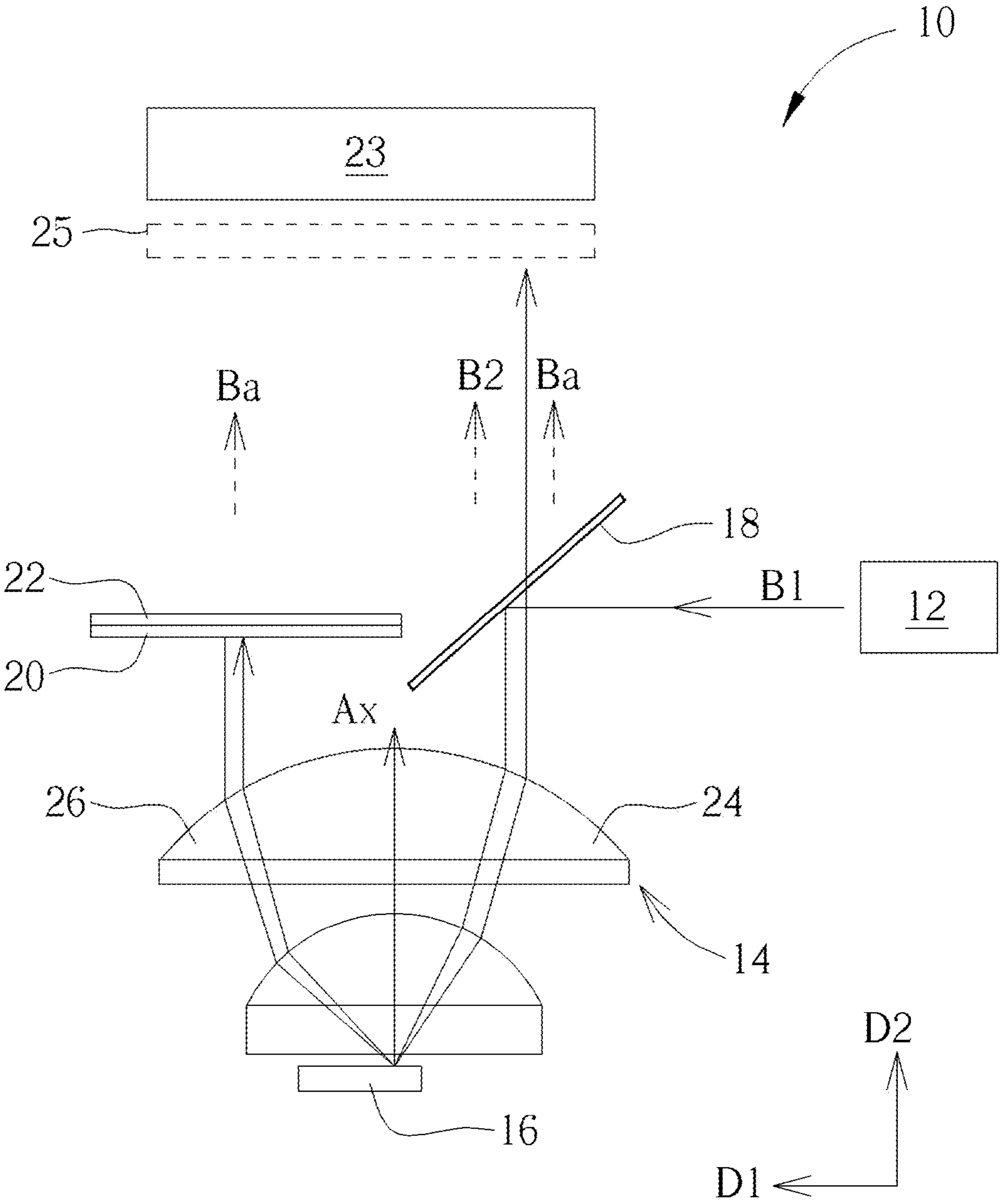
FIG. 1 to FIG. 4 are diagrams of an alignment module in several types according to different embodiments of the present invention.

Please refer to FIG. 1 to FIG. 4. FIG. 1 to FIG. 4 are diagrams of an alignment module 10 in several types according to different embodiments of the present invention. The alignment module 10 can include a light source module 12, a collimator lens 14, a wavelength transformation module 16, a polarizing beamsplitter 18, a quarter wave plate 20, a dichroic mirror 22 and an optical diffusor 23. The light source module 12 can emit a first illumination beam B1 with a first polarization state transmitted in a first direction D1 toward the polarizing beamsplitter 18. The first illumination beam B1 can be set in a first waveband (such as the blue light waveband). The collimator lens 14 can have a first part 24, a second part 26, and an axle Ax located between the first part 24 and the second part 26. The axle Ax can be a central axle of the collimator lens 14. The collimator lens 14 can be disposed between the polarizing beamsplitter 18 and the wavelength transformation module 16. The polarizing beamsplitter 18 can be disposed between the light source module 12 and the collimator lens 14, and further disposed on position corresponding to the first part 24 of the collimator lens 14.

Figure 2:
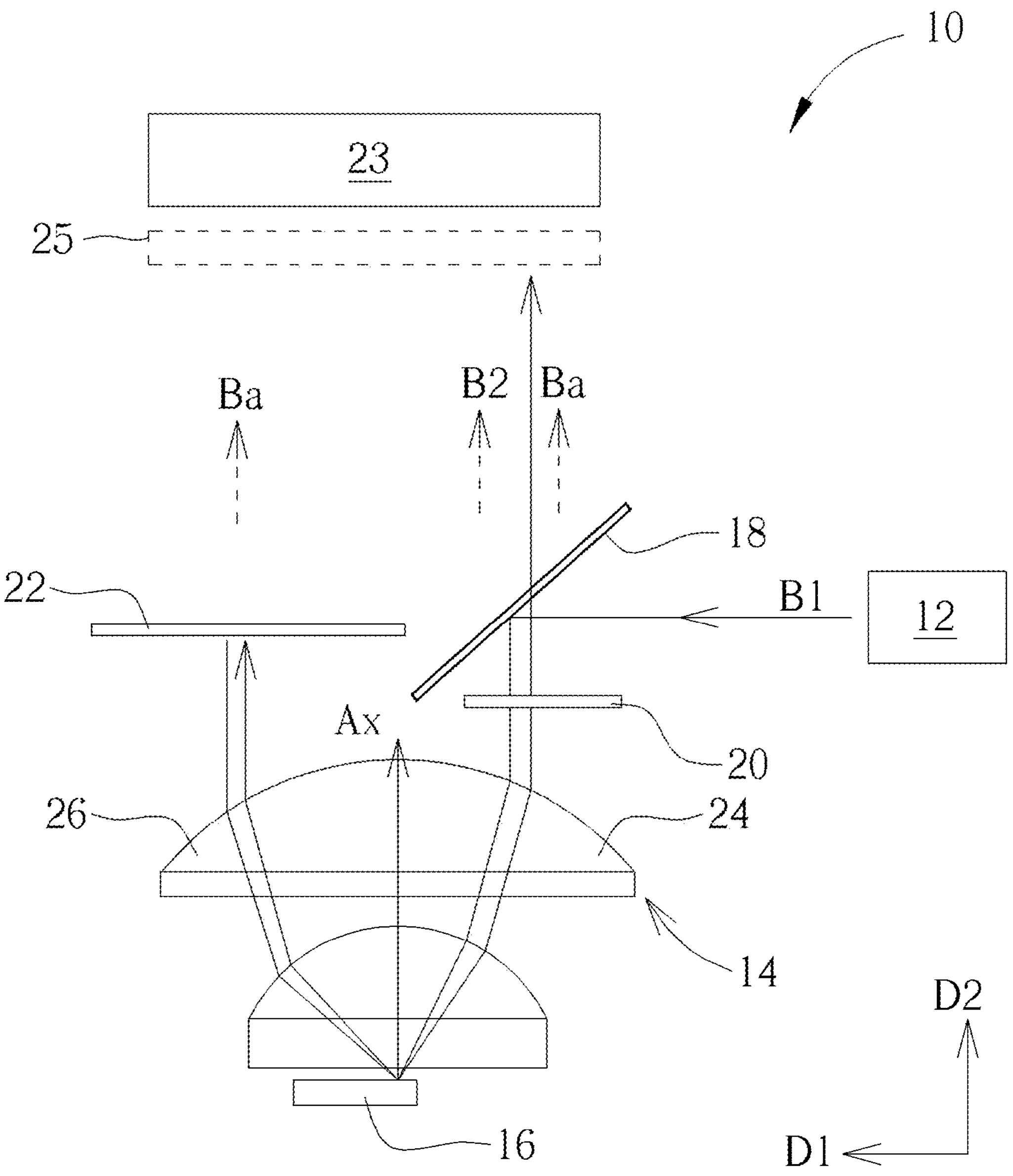

The quarter wave plate 20 can be disposed on a rear optical path relative to the polarizing beamsplitter 18, which means the light beam is reflected by the polarizing beamsplitter 18 towards the quarter wave plate 20. The quarter wave plate 20 can be further optionally disposed on a front optical path or the rear optical path relative to the collimator lens 14. For example, the quarter wave plate 20 can be disposed between the collimator lens 14 and the dichroic mirror 22, and further disposed on position corresponding to the second part 26 of the collimator lens 14, as shown in FIG. 1; the light beam can pass through the collimator lens 14 and then be transmitted towards the quarter wave plate 20, so the quarter wave plate 20 can be interpreted as being disposed on the rear optical path relative to the collimator lens 14; moreover, the quarter wave plate 20 can be disposed between the collimator lens 14 and the polarizing beamsplitter 18, and further disposed on position corresponding to the first part 24 of the collimator lens 14, as shown in FIG. 2; the light beam can pass through the quarter wave plate 20 and then be transmitted towards the collimator lens 14, so the quarter wave plate 20 can be interpreted as being disposed on the front optical path relative to the collimator lens 14.

Figure 3:
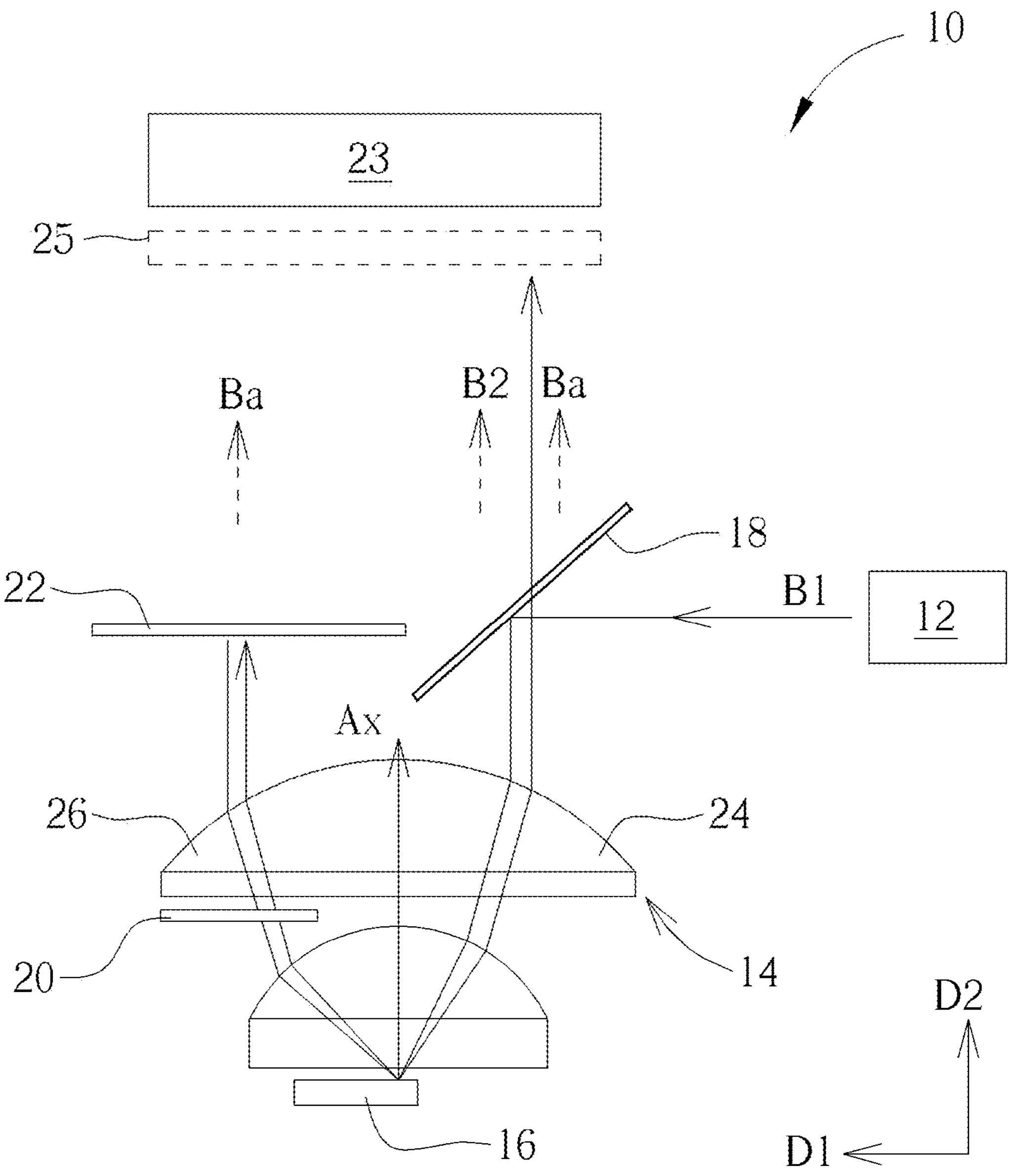
Figure 4:
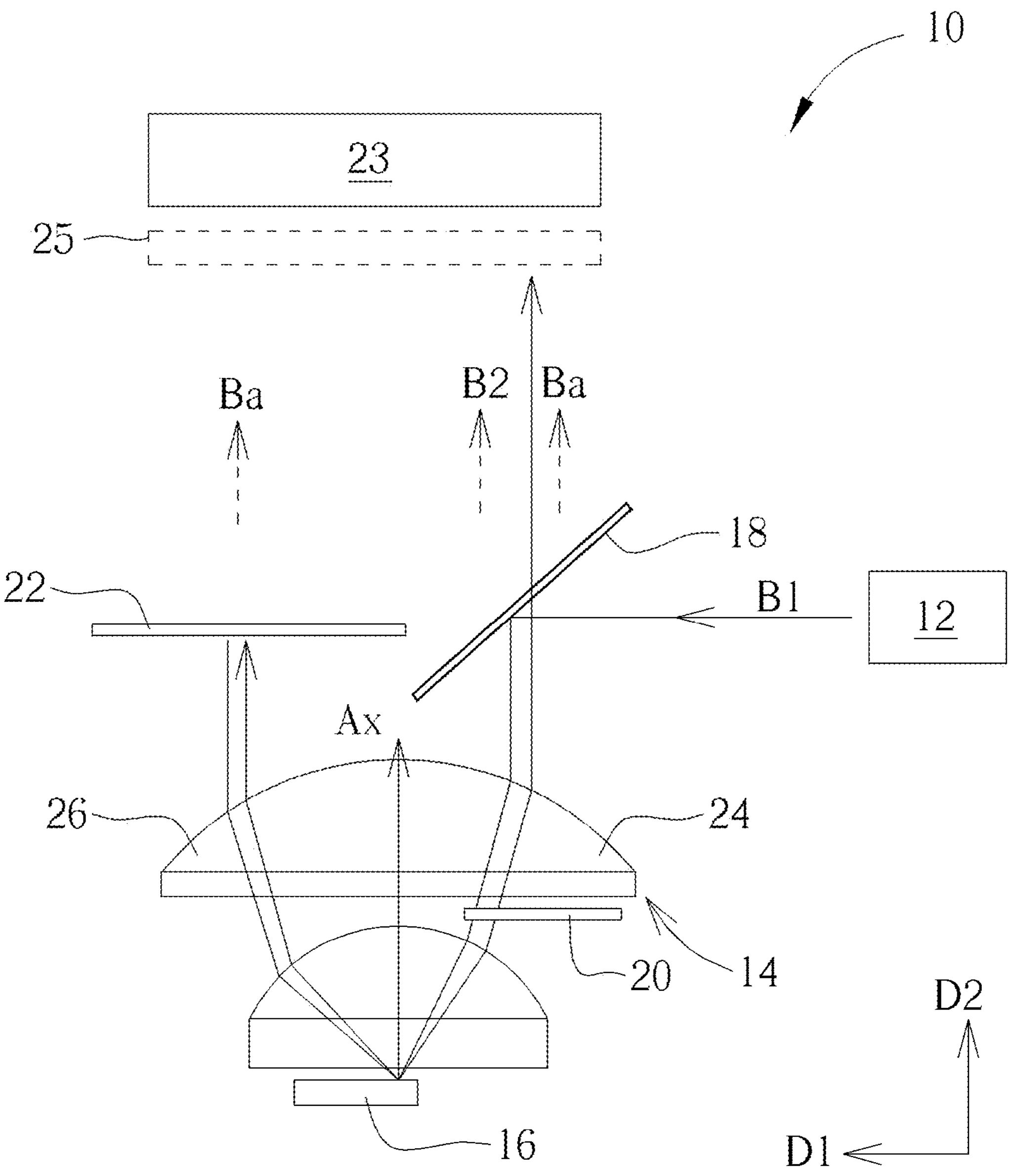

In addition, the quarter wave plate 20 can be disposed between the collimator lens 14 and the wavelength transformation module 16, and further disposed on position corresponding to the second part 26 of the collimator lens 14, as shown in FIG. 3; the light beam can pass through the first part 24 of the collimator lens 14, and then be reflected by the wavelength transformation module 16, and further pass through the quarter wave plate 20 and the second part 26 of the collimator lens 14 sequentially. Or, the quarter wave plate 20 can be disposed between the collimator lens 14 and the wavelength transformation module 16, and further disposed on position corresponding to the first part 24 of the collimator lens 14, as shown in FIG. 4; the light beam can pass through the first part 24 of the collimator lens 14, and then pass through the quarter wave plate 20 to arrive the wavelength transformation module 16, and can be further reflected by the wavelength transformation module 16 to pass through the second part 26 of the collimator lens 14.

Position of the quarter wave plate 20 is not limited to the embodiments shown in FIG. 1 to FIG. 4; it should be mentioned that the quarter wave plate 20 has to be disposed on the position corresponding to the first part 24 or the second part 26 of the collimator lens 14. Besides, the dichroic mirror 22 can be disposed on the position corresponding to the second part 26 of the collimator lens 14, and further disposed on the rear optical path relative to the quarter wave plate 20, which means the light beam can pass through the quarter wave plate 20 and then be transmitted towards the dichroic mirror 22. The dichroic mirror 22 can be used to reflect the first illumination beam B1 in the first waveband (such as the blue light waveband) and allow passing of the light beam in other waveband.

Figure 5:
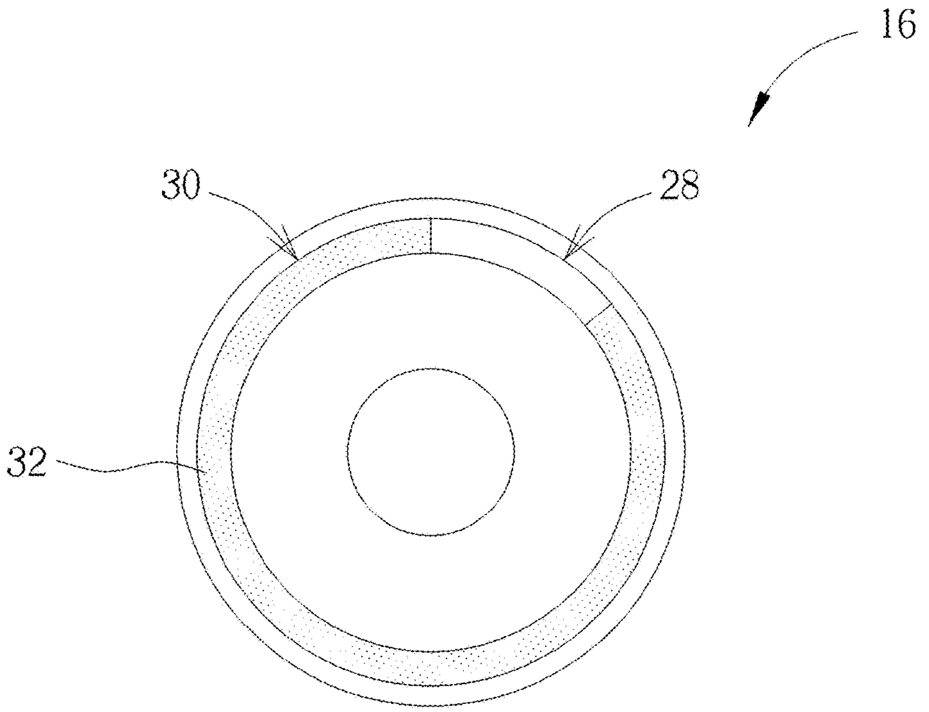
FIG. 5 is a diagram of the wavelength transformation module according to the embodiment of the present invention.
Figure 6:
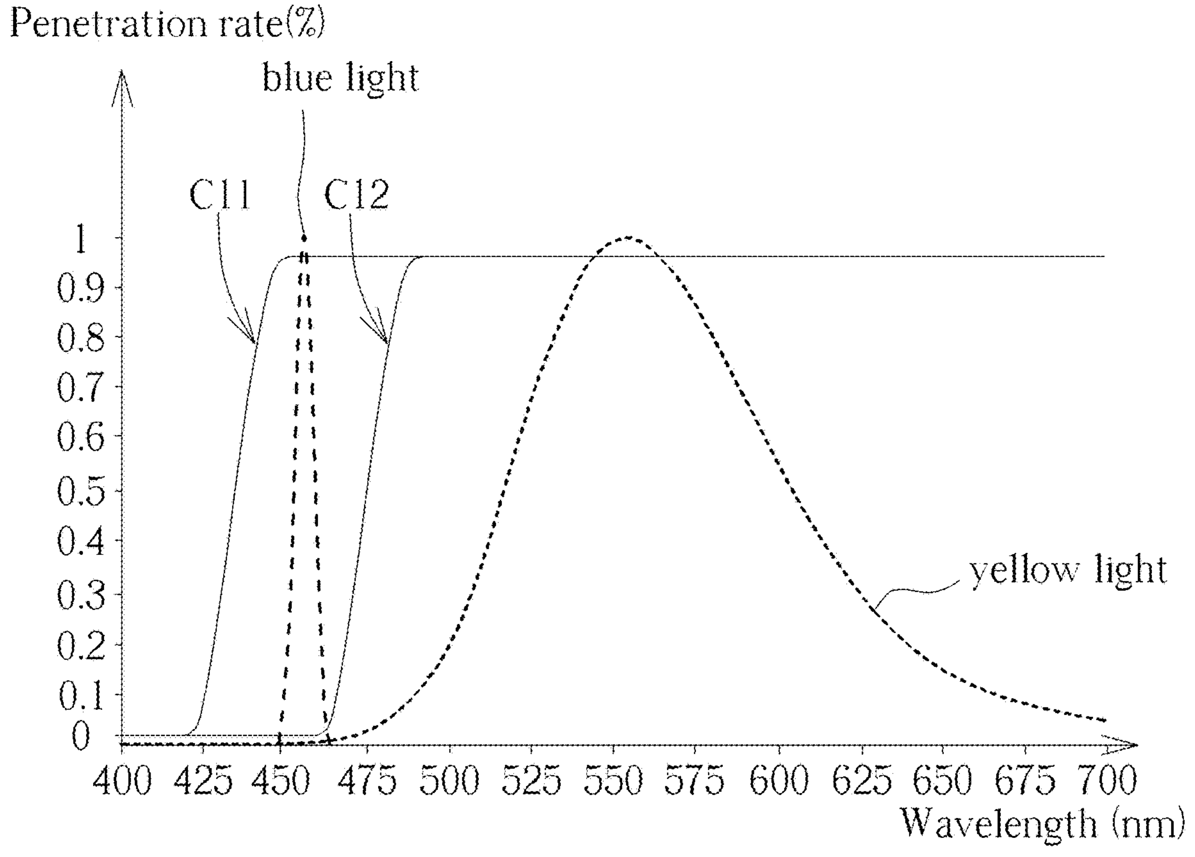
FIG. 6 is a wavelength diagram of the polarizing beamsplitter cooperated with the wavelength transformation module according to the embodiment of the present invention.
Figure 7:
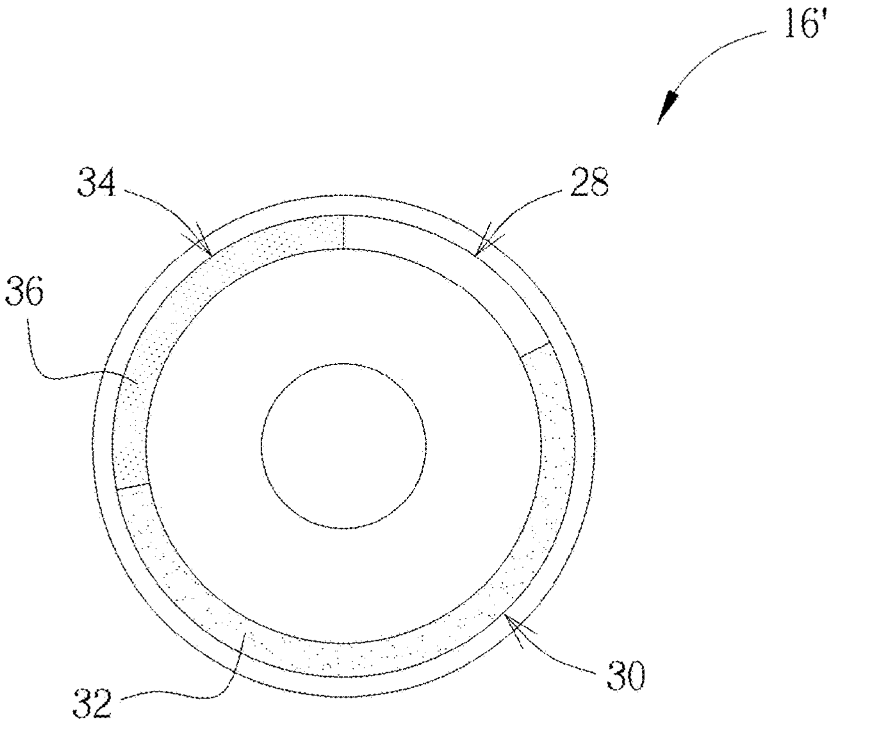
FIG. 7 is a diagram of the wavelength transformation module according to another embodiment of the present invention.
Figure 8:
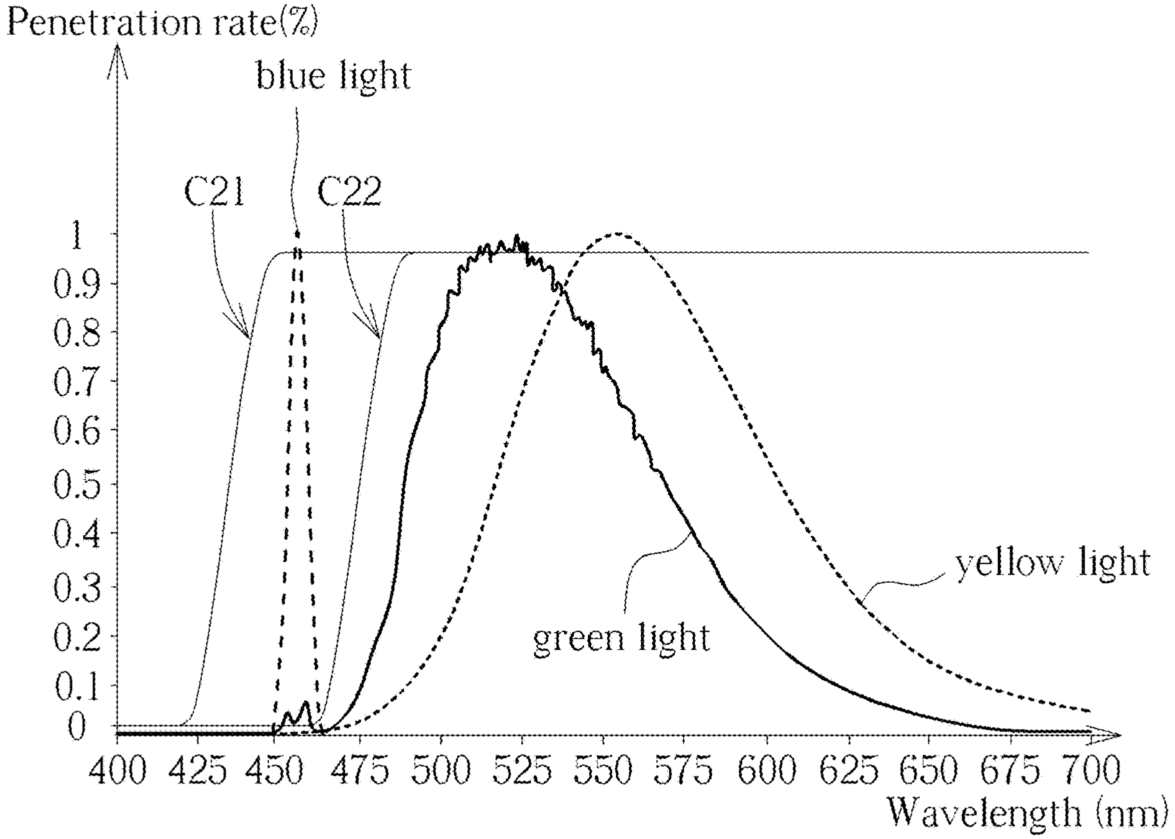
FIG. 8 is a wavelength diagram of the polarizing beamsplitter cooperated with the wavelength transformation module according to another embodiment of the present invention.
Figure 9:
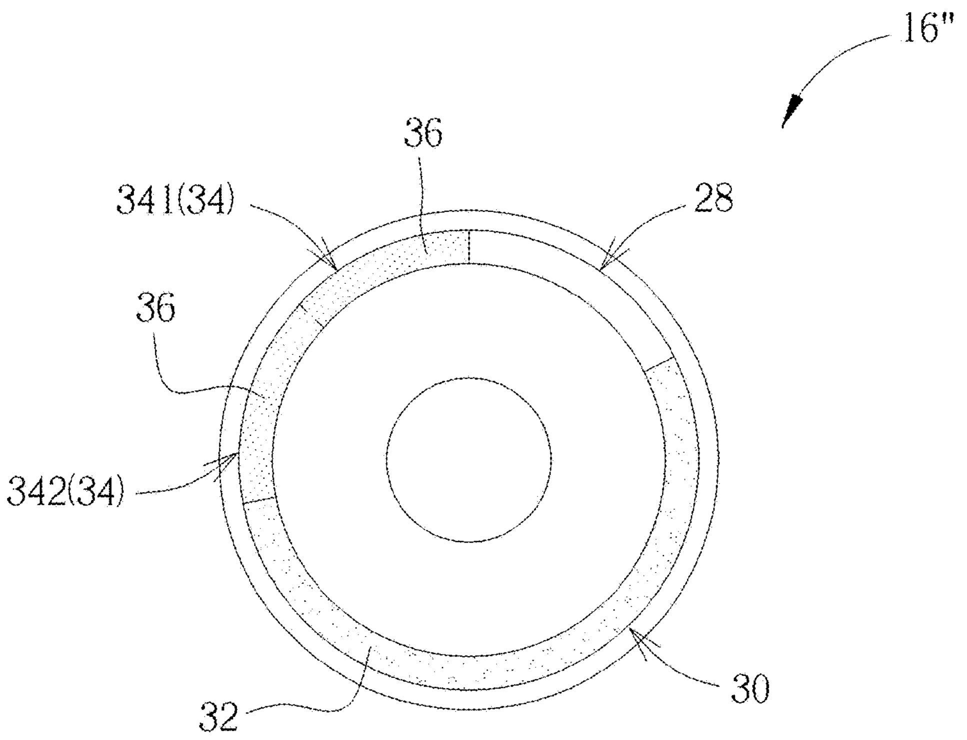
FIG. 9 is a diagram of the wavelength transformation module according to another embodiment of the present invention.
Figure 10:
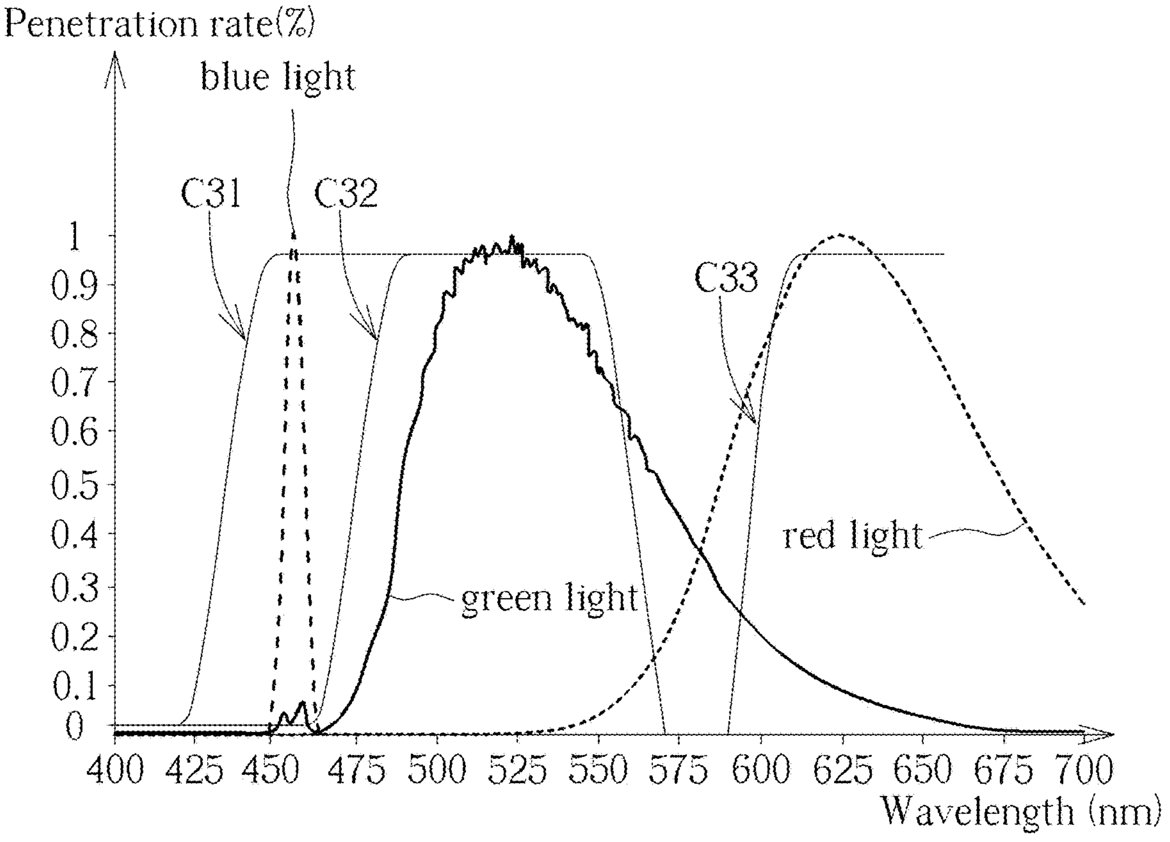
FIG. 10 is a wavelength diagram of the polarizing beamsplitter cooperated with the wavelength transformation module according to another embodiment of the present invention.

Please refer to FIG. 5 to FIG. 10. FIG. 5 is a diagram of the wavelength transformation module 16 according to the embodiment of the present invention. FIG. 6 is a wavelength diagram of the polarizing beamsplitter 18 cooperated with the wavelength transformation module 16 according to the embodiment of the present invention. FIG. 7 is a diagram of the wavelength transformation module 16' according to another embodiment of the present invention. FIG. 8 is a wavelength diagram of the polarizing beamsplitter 18 cooperated with the wavelength transformation module 16' according to another embodiment of the present invention. FIG. 9 is a diagram of the wavelength transformation module 16" according to another embodiment of the present invention. FIG. 10 is a wavelength diagram of the polarizing beamsplitter 18 cooperated with the wavelength transformation module 16" according to another embodiment of the present invention.

As shown in FIG. 5 and FIG. 6, the wavelength transformation module 16 can have a reflection region 28 and a first region 30 adjacent to each other. The reflection region 28 can be used to reflect the first illumination beam B1 incident from the first part 24 of the collimator lens 14 towards the second part 26 of the collimator lens 14. The first region 30 can include a first wavelength transformation layer 32 (such as yellow wavelength transformation material made of the yellow phosphor layer) used to receive the first illumination beam B1 and generate the actuation beam Ba in the second waveband (such as the yellow light waveband). The polarizing beamsplitter 18 that is cooperated with the wavelength transformation module 16 can provide penetration curves C11 and C12 that allow passing of the blue light and the yellow light, and the color wheel 25 can be further applied to decompose the yellow light into the green light and the red light, so that the three-color light effect of the blue light, the red light and the green light can be achieved by using one kind of phosphor powder.

As shown in FIG. 7 and FIG. 8, the wavelength transformation module 16' can have the reflection region 28, the first region 30 and a second region 34 adjacent to each other. Functions of the reflection region 28 and the first region 30 are similar to ones of the foresaid embodiment shown in FIG. 5 and FIG. 6, and a detailed description is omitted herein for simplicity. The first wavelength transformation layer 32 of the first region 30 can be the yellow wavelength transformation material made of the yellow phosphor layer. The second region 34 can include a second wavelength transformation layer 36 (such as green wavelength transformation material made of the green phosphor layer). The first wavelength transformation layer 32 and the second wavelength transformation layer 36 can be used to receive the first illumination beam B1 and generate the actuation beam Ba in the second waveband (such as the yellow light waveband and the green light waveband). The polarizing beamsplitter 18 that is cooperated with the wavelength transformation module 16' can provide penetration curves C21 and C22 that allow passing of the blue light, the green light and the yellow light, and the color wheel 25 can be further applied to decompose the yellow light into the red light, so that the three-color light effect of the blue light, the red light and the green light can be achieved accordingly.

As shown in FIG. 9 and FIG. 10, the wavelength transformation module 16" can have the reflection region 28, the first region 30 and the second region 34 adjacent to each other. Functions of the reflection region 28 are similar to ones of the foresaid embodiment shown in FIG. 5 to FIG. 8, and the detailed description is omitted herein for simplicity. The first wavelength transformation layer 32 of the first region 30 can include the green wavelength transformation material used to generate the actuation beam Ba in the second waveband for providing the green light beam. The second region 34 can be divided into two sub-regions 341 and 342, and the sub-regions 341 and 342 respectively has the second wavelength transformation layer 36 with the red wavelength transformation material, and/or the second wavelength transformation layer 36 with the orange wavelength transformation material, so as to generate the actuation beam Ba in the second waveband for providing the red light beam or the orange light beam. The polarizing beamsplitter 18 that is cooperated with the wavelength transformation module 16" can provide penetration curves C31, C32 and C33 that allow passing of the blue light, the green light and the red light (or the orange light), and the three-color light effect of the blue light, the red light and the green light can be achieved without the color wheel (which means the color wheel can be removed in the embodiments shown in FIG. 1 to FIG. 4), and further have advantages of economizing the component cost and the configuration space. Generally, the first illumination beam B1 can be set in the first waveband (such as the blue light waveband) for providing the blue light beam with the first polarization state (such as the S polarization state). The first illumination beam B1 can be transformed into the second illumination beam B2 with the second polarization state (such as the P polarization state) and still in the first waveband via double transformation of the quarter wave plate 20. The foresaid second waveband can be interpreted as other color light different from the first waveband (which means the blue light beam).

As the embodiments shown in FIG. 1 to FIG. 4, the first illumination beam B1 emitted from the light source module 12 can be reflected by the polarizing beamsplitter 18 and pass through the first part 24 of the collimator lens 14 to project onto the wavelength transformation module 16. The wavelength transformation module 16 can be a rotatable phosphor wheel or a static phosphor layer. When the first illumination beam B1 is projected onto the reflection region 28 of the wavelength transformation module 16, the first illumination beam B1 can be reflected by the reflection region 28 in the second direction D2; meanwhile, the second direction D2 can be preferably perpendicular to the first direction D1. The first illumination beam B1 reflected by the reflection region 28 can pass through the second part 26 of the collimator lens 14 to arrive the dichroic mirror 22. The first illumination beam B1 in the first waveband (such as the blue light waveband) can be reflected by the dichroic mirror 22 to pass through the second part 26 of the collimator lens 14, and further be reflected by the reflection region 28 of the wavelength transformation module 16 to pass through the first part 24 of the collimator lens 14.

The quarter wave plate 20 can be optionally disposed on the front optical path or the rear optical path relative to collimator lens 14, or disposed between the collimator lens 14 and the wavelength transformation module 16, so that the first illumination beam B1 can be transformed into the second illumination beam B2 with the second polarization state transmitted in the second direction D2 via the double transformation of the quarter wave plate 20 before arriving the polarizing beamsplitter 18; the second illumination beam B2 can be still in the first waveband. The polarizing beamsplitter 18 can allow passing of other color light and the blue light beam with the second polarization state, and therefore the second illumination beam B2 can pass through the polarizing beamsplitter 18 and be received by the optical diffusor 23. The optical diffusor 23 can be disposed on position corresponding to the wavelength transformation module 16. The optical diffusor 23 can be a light pipe, a light guide or a lens array used to homogenize energy of the received light beam (such as the second illumination beam B2). The color wheel 25 can be disposed in front of the optical diffusor 23, and used to decompose the light beam in the specific waveband (such as the yellow light) into the light beam in other wavebands (such as the green light and the red light); position and a waveband transformation function of the color wheel 25 are not limited to the foresaid embodiment.

If the first illumination beam B1 is projected onto the actuation region (which may be the first region 30 or the second region 34) of the wavelength transformation module 16, 16' or 16", the first illumination beam B1 can be transformed into the actuation beam Ba via the wavelength transformation module 16, and the actuation beam Ba can be transmitted towards the first part 24 and the second part 26 of the collimator lens 14 in the second direction D2 (or in a direction slightly tilted relative to the second direction D2). The actuation beam Ba can pass through the polarizing beamsplitter 18 and the dichroic mirror 22, and further optionally pass through the color wheel 25 (which depends on features of the second wavelength transformation layer 36 for determining whether to filter the actuation beam Ba by the color wheel 25), and then be received by the optical diffusor 23. Therefore, the alignment module 10 can alternately reflect the first illumination beam B1 and generate the actuation beam Ba in accordance with rotation of the wavelength transformation module 16; the optical diffusor 23 can accordingly receive and homogenize the second illumination beam B2 passing through the polarizing beamsplitter 18 from the first part 24 of the collimator lens 14, and the actuation beam Ba passing through the polarizing beamsplitter 18 and the dichroic mirror 22 from the first part 24 and the second part 26 of the collimator lens 14.

In conclusion, the alignment module of the present invention can utilize feature of the illumination beam with a specific polarization state passing through the quarter wave plate twice to transform into the illumination beam with another polarization state, and feature of the quarter wave plate that allows passing of the actuation beam with the small-sized polarizing beamsplitter (which only corresponds to the left portion or a right portion of the collimator lens) to pass the illumination beam through the quarter wave plate back and forth for the double transformation, so as to provide light splitting and mixing functions via the polarizing beamsplitter for decreasing a number of optical components and manufacturing cost of the projection apparatus.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An alignment module comprising:

a light source module adapted to emit a first illumination beam with a first polarization state in a first direction;

a collimator lens having a first part, a second part, and an axle located between the first part and the second part;

a wavelength transformation module adapted to receive the first illumination beam from the first part of the collimator lens, and alternately generate an actuation beam and reflect the first illumination beam, the actuation beam being transmitted towards the first part and the second part of the collimator lens in a second direction, the first illumination beam being reflected towards the second part of the collimator lens in the second direction, the second direction being perpendicular to the first direction;

a polarizing beamsplitter disposed on position only corresponding to the first part, the polarizing beamsplitter being adapted to reflect the first illumination beam with the first polarization state, and further allow passing of the actuation beam and a second illumination beam with a second polarization state;

a quarter wave plate disposed on position only corresponding to one of the first part and the second part and further on a rear optical path relative to the polarizing beamsplitter, the first illumination beam with the first polarization state being transformed into the second illumination beam with the second polarization state via the quarter wave plate; and a dichroic mirror disposed on position only corresponding to the second part, and further on a rear optical path relative to the quarter wave plate, the dichroic mirror being adapted to allow passing of the actuation beam and further to reflect the first illumination beam from the quarter wave plate.

2. The alignment module of claim 1, wherein the first illumination beam and the second illumination beam are in a first waveband, and the actuation beam is in a second waveband different from the first waveband.

3. The alignment module of claim 2, wherein the first waveband provides a blue light beam, and the second waveband provides a yellow light beam, or a green light beam or a red light beam or an orange light beam.

4. The alignment module of claim 1, wherein the wavelength transformation module is adapted to further reflect the second illumination beam with the second polarization state towards the first part of the collimator lens, so as to pass through the polarizing beamsplitter.

5. The alignment module of claim 1, wherein the quarter wave plate is disposed on a rear optical path relative to the collimator lens and further on position corresponding to the second part.

6. The alignment module of claim 1, wherein the quarter wave plate is disposed on a front optical path relative to the collimator lens and further on position corresponding to the first part.

7. The alignment module of claim 1, wherein the quarter wave plate is disposed between the collimator lens and the wavelength transformation module, and further on position corresponding to the first part or the second part.

8. The alignment module of claim 1, wherein the first illumination beam reflected by the polarizing beamsplitter passes through the collimator lens towards the wavelength transformation module in a direction opposite to the second direction, and then is further alternately reflected by the wavelength transformation module, so as to transform into the second illumination beam via double transformation of the quarter wave plate.

9. The alignment module of claim 1, wherein the first illumination beam reflected by the polarizing beamsplitter passes through the collimator lens towards the wavelength transformation module in a direction opposite to the second direction, and then is further alternately transformed by the wavelength transformation module to generate the actuation beam in the second direction.

10. The alignment module of claim 1, wherein the first illumination beam passes through the quarter wave plate towards the dichroic mirror, and then is reflected by the dichroic mirror to further pass through the quarter wave plate for transforming into the second illumination beam.

11. The alignment module of claim 1, wherein the axle is a central axle of the collimator lens.

12. The alignment module of claim 1, wherein the wavelength transformation module comprises a first region and a reflection region, the first region has a first wavelength transformation layer adapted to receive the first illumination beam and generate the actuation beam, the reflection region is disposed adjacent to the first region and adapted to reflect the first illumination beam incident from the first part of the collimator lens towards the second part of the collimator lens.

13. The alignment module of claim 12, wherein the first wavelength transformation layer comprises yellow wavelength transformation material, and the wavelength transformation module is rotatable.

14. The alignment module of claim 12, wherein the wavelength transformation module further comprises a second region disposed adjacent to the first region and having a second wavelength transformation layer, the second wavelength transformation layer is adapted to receive the first illumination beam and generate the actuation beam, the first wavelength transformation layer comprises yellow wavelength transformation material, and second wavelength transformation layer comprises green wavelength transformation material.

15. The alignment module of claim 12, wherein the wavelength transformation module further comprises a second region disposed adjacent to the first region and having a second wavelength transformation layer, the second wavelength transformation layer is adapted to receive the first illumination beam and generate the actuation beam, the first wavelength transformation layer comprises green wavelength transformation material, and second wavelength transformation layer comprises red wavelength transformation material or orange wavelength transformation material.

16. The alignment module of claim 1, further comprising:

an optical diffusor disposed on position corresponding to the wavelength transformation module, and adapted to receive the actuation beam from the first part and the second part and the second illumination beam from the first part.

17. The alignment module of claim 16, further comprising:

a color wheel disposed on a front optical path relative to the optical diffusor.

18. The alignment module of claim 1, wherein the polarizing beamsplitter is adapted to reflect a blue light beam with the first polarization state, and further allow passing of other color light beams and the blue light beam with the second polarization state.

* * * * *